US012451521B2

(12) United States Patent
Sodeyama

(10) Patent No.: US 12,451,521 B2
(45) Date of Patent: Oct. 21, 2025

(54) SECONDARY BATTERY, ELECTRONIC DEVICE, AND ELECTRIC TOOL

(71) Applicant: MURATA MANUFACTURING CO., LTD., Kyoto (JP)

(72) Inventor: Kunio Sodeyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 606 days.

(21) Appl. No.: 17/879,144

(22) Filed: Aug. 2, 2022

(65) Prior Publication Data

US 2022/0376307 A1 Nov. 24, 2022

Related U.S. Application Data

(63) Continuation of application No. PCT/JP2021/006586, filed on Feb. 22, 2021.

(30) Foreign Application Priority Data

Mar. 5, 2020 (JP) ................ 2020-037805

(51) Int. Cl.
*H01M 10/0587* (2010.01)
*H01M 10/0525* (2010.01)
*H01M 50/152* (2021.01)

(52) U.S. Cl.
CPC ... *H01M 10/0587* (2013.01); *H01M 10/0525* (2013.01); *H01M 50/152* (2021.01); *H01M 2220/30* (2013.01)

(58) Field of Classification Search
CPC ......... H01M 10/0587; H01M 10/0525; H01M 50/152; H01M 2220/30; H01M 10/0431;
(Continued)

(56) References Cited

U.S. PATENT DOCUMENTS

2018/0323419 A1 11/2018 Shiraga et al.

FOREIGN PATENT DOCUMENTS

| JP | H09161814 | * | 6/1997 | .............. Y02P 70/50 |
| JP | 2002-216709 | | 8/2002 | |

(Continued)

OTHER PUBLICATIONS

International Search Report of corresponding PCT application PCT/JP2021/006586, dated May 11, 2021.
(Continued)

*Primary Examiner* — Helen Oi K Conley
(74) *Attorney, Agent, or Firm* — K&L Gates LLP

(57) ABSTRACT

A secondary battery includes: an electrode wound body having a structure in which a strip-shaped negative electrode and a strip-shaped positive electrode opposing each other are laminated and wound with a separator interposed therebetween; a battery can accommodating the electrode wound body; and a battery lid provided over a cavity of the battery can, wherein the positive electrode has a positive electrode end that is located toward the battery lid, the battery can includes: a thick portion that is located toward the battery lid; a thin portion that is located toward a can bottom and has a thickness smaller than a thickness of the thick portion; and a thickness varying portion between the thick portion and the thin portion, and in a sectional view, the thick portion is disposed so as to overlap the positive electrode end.

10 Claims, 6 Drawing Sheets

(58) Field of Classification Search
CPC ............. H01M 50/103; H01M 50/107; H01M 50/119; H01M 50/538; H01M 50/55; H01M 10/04; H01M 50/10; H01M 50/531; Y02E 60/10; Y02P 70/50
See application file for complete search history.

(56) References Cited

FOREIGN PATENT DOCUMENTS

| | | |
|---|---|---|
| JP | 2002216709 A | 8/2002 |
| JP | 2007234305 A | 9/2007 |
| KR | 20070027353 A | 3/2007 |
| WO | 2017085918 A1 | 5/2017 |

OTHER PUBLICATIONS

Chinese Office Action issued Nov. 29, 2022 in corresponding Chinese Application No. 202190000280.

* cited by examiner

SECONDARY BATTERY, ELECTRONIC DEVICE, AND ELECTRIC TOOL

CROSS REFERENCE TO RELATED APPLICATIONS

The present application is a continuation of PCT patent application no. PCT/JP2021/006586, filed on Feb. 22, 2021, which claims priority to Japanese patent application no. JP2020-037805, filed on Mar. 5, 2020, the entire contents of which are incorporated herein by reference.

BACKGROUND

The present application relates to a secondary battery, an electronic device, and an electric tool.

The applications of secondary batteries such as lithium ion batteries have been extended to electric cars, electric tools, and the like. Batteries for these applications are used over a relatively long working hours, and under an environment where the batteries are subjected to vibration. Therefore, these batteries are desired to have a large capacity and furthermore to have a vibration resistance.

A battery is described where the thickness of the battery is reduced at a position where the electrode wound body presents, and the thickness of the battery is increased at a position of 0 mm or more and 1.2 mm or less away from the tip of the electrode wound body toward the battery lid, whereby a battery having a large capacity and a high strength at a crimped portion can be realized.

SUMMARY

The present application relates to a secondary battery, an electronic device, and an electric tool.

However, there has been a problem in which when the battery described in the Background section is subjected to vibration, the electrode wound body moves in the battery can and collides with a safety valve mechanism or the like, whereby the value of the internal resistance of the battery increases.

Therefore, the present application relates to providing a secondary battery having a vibration resistance according to an embodiment.

In order to solve the above-described problems, the present application relates to, in an embodiment, a secondary battery including: an electrode wound body having a structure in which a strip-shaped negative electrode and a strip-shaped positive electrode opposing each other are laminated and wound with a separator interposed therebetween; a battery can accommodating the electrode wound body; and a battery lid provided over a cavity of the battery can, wherein the positive electrode has a positive electrode end that is located toward the battery lid, the battery can includes: a thick portion that is located toward the battery lid; a thin portion that is located toward a can bottom and has a thickness smaller than a thickness of the thick portion; and a thickness varying portion between the thick portion and the thin portion, and in a sectional view, the thick portion is disposed so as to overlap the positive electrode end.

According to an embodiment of the present application, there can be provided a secondary battery having a vibration resistance. Note that the present application is not to be construed as being limited by the effects exemplified described herein.

DETAILED DESCRIPTION

Hereinafter, the present application will be described in further detail including with reference to the drawings according to an embodiment.

The present application described herein includes preferred specific examples, and the present application is not limited thereto.

In an embodiment of the present application, a cylindrical lithium ion battery will be described as an example of the secondary battery.

Figure 1:
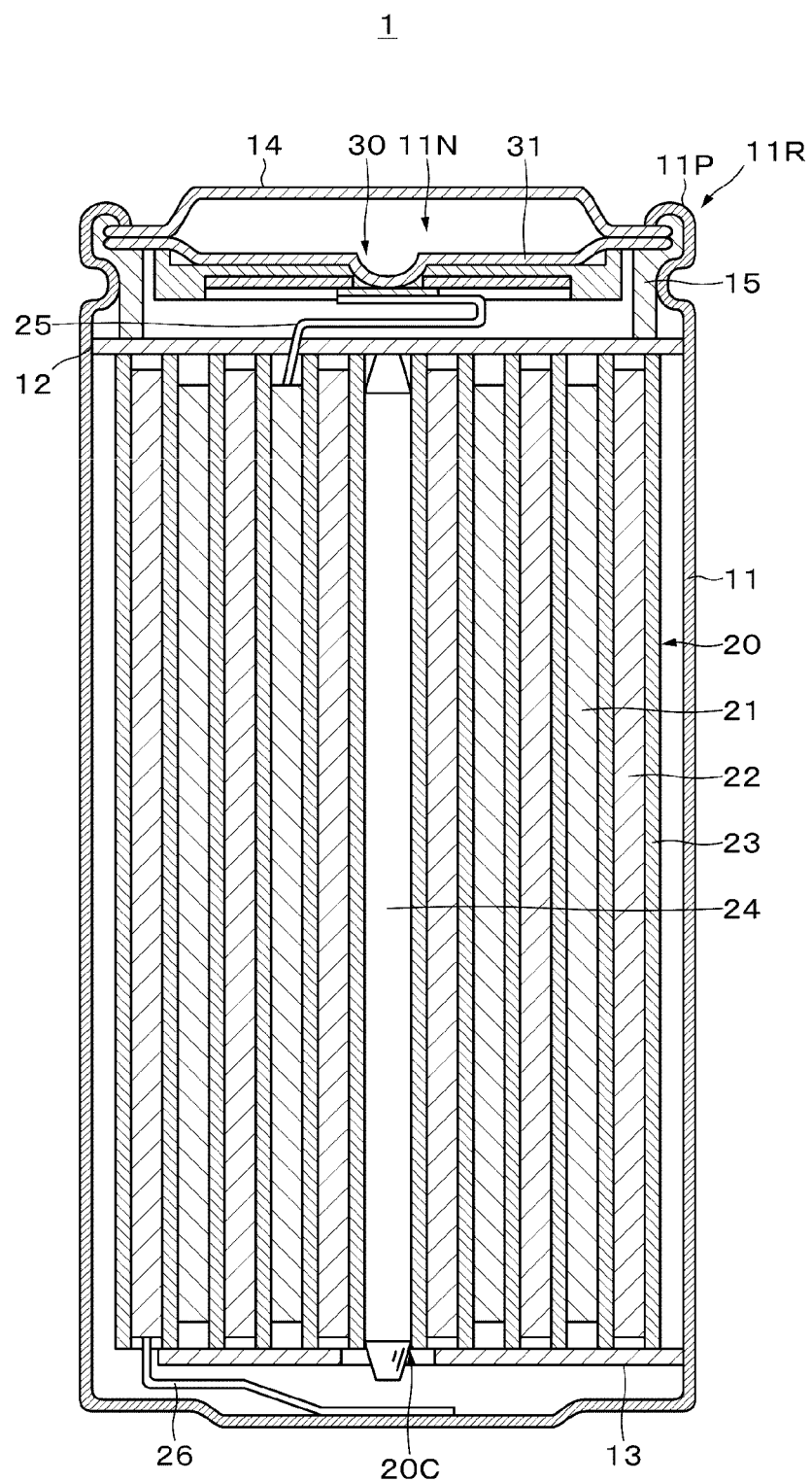
FIG. 1 is a schematic sectional view of a battery according to an embodiment.
Figure 2:
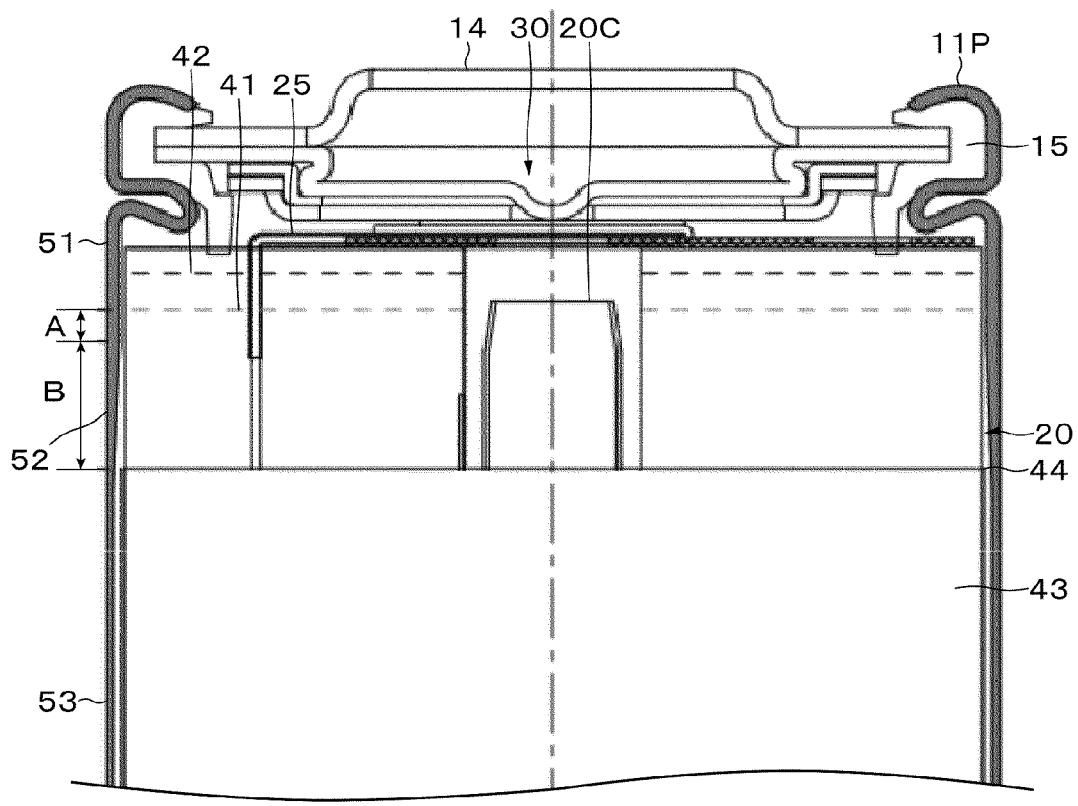
FIG. 2 is a diagram of describing Example 1.

First, the overall configuration of the lithium ion battery will be described. FIG. 1 is a schematic sectional view of a lithium ion battery 1. FIG. 2 is a closeup view of the upper side of FIG. 1. The lithium ion battery 1 is, for example, a cylindrical lithium ion battery 1 in which an electrode wound body 20 is housed inside a battery can 11 as shown in FIG. 1.

Specifically, the lithium ion battery 1 includes a pair of insulating plates 12 and 13 and an electrode wound body 20 inside a cylindrical battery can 11.

The insulating plates 12 and 13 are sheet-like members having surfaces substantially perpendicular to the winding axis direction (vertical direction in FIG. 1) of the electrode wound body 20. The insulating plates 12 and 13 are disposed so as to sandwich the electrode wound body 20 therebetween. Examples of materials used for the insulating plates 12 and 13 include polyethylene terephthalate (PET), polypropylene (PP), and Bakelite. Examples of Bakelite include paper Bakelite and cloth Bakelite, which are prepared by coating a phenolic resin on paper or cloth respectively followed by heating.

At an open edge 11N of the battery can 11, a battery lid 14 and a safety valve mechanism 30 are crimped at a bent portion 11P with a gasket 15 interposed therebetween, thereby forming a crimped structure 11R. As a result, the battery can 11 is hermetically sealed in a state where the electrode wound body 20 and the like are housed inside the battery can 11.

The battery lid 14 is a member that is provided over the cavity of the battery can 11 and closes the open edge 11N of the battery can 11 in such a way that the electrode wound body 20 and the like are housed inside the battery can 11. This battery lid 14 contains the same material as the material used to form the battery can 11. The central region of the battery lid 14 protrudes toward the vertical direction of FIG. 1. In contrast, a peripheral region other than the central region of the battery lid 14 is in contact with the safety valve mechanism 30. Although not illustrated, a PTC element such as a thermistor may be provided between the battery lid 14 and the safety valve mechanism 30.

The gasket 15 is a member that is interposed between the inside of the bent portion 11P of the battery can 11 and the edge of the battery lid 14 thereby sealing the gap between the bent portion 11P and the battery lid 14. The surface of the gasket 15 may be coated with asphalt or the like, for example.

The gasket 15 contains an insulating material. The type of the insulating material is not particularly limited, and examples thereof include a polymer material such as polybutylene terephthalate (PBT) or polypropylene (PP). This is because the gap between the bent portion 11P and the battery lid 14 is sufficiently sealed while the battery can 11 and the battery lid 14 are electrically isolated from each other.

The battery can 11 is a member that houses the electrode wound body 20. This battery can 11 is a cylindrical container in which one edge is opened and the other edge is closed. That is, the battery can 11 has an open edge (open edge 11N). The battery can 11 contains one of, or two or more of metal materials such as iron, aluminum, and alloys thereof. However, one of, or two or more of metal materials such as nickel may be plated on the surface of the battery can 11.

When the pressure (internal pressure) inside the battery can 11 increases, the safety valve mechanism 30 releases the sealed state of the battery can 11 as necessary thereby reducing the internal pressure. The cause of rising the internal pressure of the battery can 11 is a gas generated due to a decomposition reaction of the electrolytic solution during charging and discharging.

In a cylindrical lithium ion battery, a strip-shaped positive electrode 21 and a strip-shaped negative electrode 22 are spirally wound with a separator 23 interposed therebetween, and are housed in the battery can 11 with being impregnated into an electrolytic solution. Although not illustrated, the positive electrode 21 and the negative electrode 22 are a positive electrode foil and a negative electrode foil, on one side or both sides of which are a positive electrode active material layer and a negative electrode active material layer formed, respectively. The material of the positive electrode foil is a metal foil containing aluminum or an aluminum alloy. The material of the negative electrode foil is a metal foil containing nickel, a nickel alloy, copper, or a copper alloy. The separator 23 is a porous insulating film, which enables lithium ions to migrate while electrically insulating the positive electrode 21 and the negative electrode 22.

At the center of the electrode wound body 20 is provided a space (central space 20C) formed when the positive electrode 21, the negative electrode 22, and the separator 23 are wound, and a center pin 24 is inserted into the central space 20C (see FIG. 1). However, the center pin 24 can be omitted.

A positive electrode leading-wire 25 is connected to the positive electrode 21, and a negative electrode leading-wire 26 is connected to the negative electrode 22 (see FIG. 1). The positive electrode leading-wire 25 contains a conductive material such as aluminum. The positive electrode leading-wire 25 is connected to the safety valve mechanism 30 and is electrically connected to the battery lid 14. The negative electrode leading-wire 26 contains a conductive material such as nickel. The negative electrode leading-wire 26 is electrically connected to the battery can 11. Detailed configurations and materials of the positive electrode 21, the negative electrode 22, the separator 23, and the electrolytic solution will be described later.

The positive electrode active material layer contains at least a positive electrode material (positive electrode active material) capable of occluding and releasing lithium, and may further contain a positive electrode binder, a positive electrode conductive agent, and the like. The positive electrode material is preferably a lithium-containing compound (e.g., a lithium-containing composite oxide or a lithium-containing phosphate compound).

The lithium-containing composite oxide has, for example, a layered rock salt-type or spinel-type crystal structure. The lithium-containing phosphate compound has, for example, an olivine type crystal structure.

The positive electrode binder contains a synthetic rubber or a polymer compound. Examples of the synthetic rubber include a styrene-butadiene-based rubber, a fluorine-based rubber, and ethylene propylene diene. Examples of the polymer compound include polyvinylidene fluoride (PVdF) and a polyimide.

The positive electrode conductive agent is a carbon material such as graphite, carbon black, acetylene black, or Ketjen black. However, the positive electrode conductive agent may be a metal material or a conductive polymer.

The surface of the negative electrode foil is preferably a roughened surface. This is because a so-called anchor effect enhances the close contact between the negative electrode active material layer and the negative electrode foil. Examples of surface roughening methods include a method of forming fine particles using an electrolytic process thereby providing unevenness on the surface of the negative electrode foil. A copper foil prepared by the electrolytic process is generally called an electrolytic copper foil.

The negative electrode active material layer contains at least a negative electrode material (negative electrode active material) capable of occluding and releasing lithium, and may further contain a negative electrode binder, a negative electrode conductive agent, and the like.

The negative electrode material contains, for example, a carbon material. This is because the change in crystal structure of carbon material is very small at the time of occluding and releasing of lithium, whereby a high energy density can be stably achieved. Moreover, the carbon material also acts as a negative electrode conductive agent, as a result the conductivity of the negative electrode active material layer is enhanced.

The carbon material is graphitizable carbon, non-graphitizable carbon, graphite, low crystalline carbon, or amorphous carbon. The carbon material is in a fibrous, spherical, granular, or flake shape.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0 < x \leq 2$)), silicon carbide (SiC), an alloy of carbon and silicon, and lithium titanate (LTO).

In the lithium ion battery 1, when the open circuit voltage (that is, the battery voltage) at full charge is 4.25 V or more, then the amount of lithium released per unit mass increases with use of the same positive electrode active material as compared with the case where the open circuit voltage at full charge is low. As a result, a high energy density can be achieved.

The separator 23 is a porous film containing a resin, and may be a laminated film of two or more kinds of porous films. Examples of the resin include polypropylene and polyethylene.

The separator 23 includes a substrate layer of a porous membrane, and may include a resin layer on one side or both sides of the substrate layer. This is because the close contact between the separator 23 and each of the positive electrode 21 and the negative electrode 22 is enhanced, thereby suppressing the strain of the electrode wound body 20.

The resin layer contains a resin such as PVdF. In forming this resin layer, a solution containing the resin dissolved in an organic solvent is coated on the substrate layer, and then the substrate layer is dried. Note that the substrate layer is immersed into the solution, and then the substrate layer may be dried. The resin layer preferably contains inorganic particles or organic particles in terms of enhancing the heat resistance and the safety of the battery. Examples of the types of the inorganic particles include aluminum oxide, aluminum nitride, aluminum hydroxide, magnesium hydroxide, boehmite, talc, silica, and mica. In place of the resin layer, there may be used a surface layer, mainly containing inorganic particles, formed by a sputter deposition method, an atomic layer deposition (ALD) method, or the like.

The electrolytic solution contains a solvent and an electrolyte salt, and may further contain an additive or the like, as necessary. The solvent is water or a nonaqueous solvent such as an organic solvent. An electrolytic solution containing a nonaqueous solvent is referred to as a nonaqueous electrolytic solution. Examples of the nonaqueous solvent include a cyclic carbonic acid ester, a chain carbonic acid ester, a lactone, a chain carboxylic acid ester, and a nitrile (a mononitrile).

A representative example of the electrolyte salt is a lithium salt, but a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts can also be used in mixture, and among them, $LiPF_6$ and $LiBF_4$ are preferably used in mixture from the viewpoint of enhancing battery characteristics. The content of the electrolyte salt is not particularly limited, but is preferably 0.3 mol/kg to 3 mol/kg with respect to the solvent.

Hereinafter, a method of manufacturing a secondary battery will be described. First, in the preparation of the positive electrode 21, a positive electrode active material, a positive electrode binder, and a positive electrode conductive agent are mixed to prepare a positive electrode mixture. Subsequently, the positive electrode mixture is dispersed in an organic solvent thereby preparing a pasty positive electrode mixture slurry. Subsequently, the positive electrode mixture slurry is coated on both surfaces of the positive electrode foil and then dried thereby forming a positive electrode active material layer. Subsequently, on heating the positive electrode active material layer, the positive electrode active material layer is compression-molded using a roll press machine to give the positive electrode 21.

The negative electrode 22 is also prepared in the same procedure as the positive electrode 21 described above.

Next, the positive electrode leading-wire 25 and the negative electrode leading-wire 26 are connected to the positive electrode foil and the negative electrode foil, respectively, by using a welding method. Subsequently, the positive electrode 21 and the negative electrode 22 are laminated with the separator 23 interposed therebetween and then they are wound, and a fixing tape is attached to the outermost peripheral surface of the separator 23 thereby forming the electrode wound body 20.

Subsequently, the electrode wound body 20 is housed inside the battery can 11 in a such a way that the insulator is in contact with the side of the electrode wound body 20 having the negative electrode leading-wire 26 exposed, and the can bottom and the negative electrode leading-wire 26 are connected by using a welding method. Next, another insulator is placed on the side of the electrode wound body 20 having the positive electrode leading-wire 25 exposed, and one end of the positive electrode leading-wire 25 is connected to the safety valve mechanism 30 by using a welding method.

Subsequently, the battery can 11 is deformed by using a beading machine (grooving machine) to form a recess in the battery can 11. Subsequently, an electrolytic solution is injected into the battery can 11 thereby impregnating the electrode wound body 20 with the electrolytic solution. Subsequently, the battery lid 14 and the safety valve mechanism 30 together with the gasket 15 are housed inside the battery can 11.

Finally, as shown in FIG. 1, the battery lid 14 and the safety valve mechanism 30 are crimped at the open edge 11N of the battery can 11 with the gasket 15 interposed therebetween thereby forming the crimped structure 11R.

EXAMPLES

Hereinafter, the present application will be described based on examples regarding a vibration test and an overcharge test using the battery 1 prepared as described above according to an embodiment. The present application is not limited to the examples description herein.

The outermost peripheral surface of the electrode wound body 20 was attached with a fixing tape 43 thereby fixed. The outer diameter of the electrode wound body 20 was 17.7 mm, and the thickness of the fixing tape 43 was 50 μm. Hereinafter, the end of the fixing tape 43 that is located toward the battery lid 14 is referred to as a fixing tape end 44. The end of the positive electrode 21, included in the electrode wound body 20, that is located toward the battery lid 14 was referred to as a positive electrode end 41, and the end of the negative electrode 22 that is located toward the battery lid was referred to as a negative electrode end 42. A relatively thick portion (e.g., having a thickness of 0.3 mm) of the battery can 11 that is located toward the battery lid 14 was referred to as a thick portion 51, a relatively thin portion (e.g., having a thickness of 0.2 mm) of the battery can 11 that is located toward the can bottom was referred to as a thin portion 53, and a portion located between the thick portion 51 and the thin portion 53 where the battery can 11 has varied thickness was referred to as a thickness varying portion 52. A negative electrode leading-wire joined to the outermost periphery of the negative electrode 22 was referred to as a negative electrode outer tab 45, and the end of the negative electrode outer tab 45 that is located toward the battery lid 14 was referred to as a negative electrode outer tab end 46.

In the battery 1, the positive electrode 21 and the negative electrode 22 opposing and overlapping each other are wound thereby forming an electrode wound body 20. That is, the negative electrode end 42 is located closer to the battery lid 14 than the positive electrode end 41 is, and downward away from the positive electrode end 41 toward the can bottom are present the positive electrode 21, the negative electrode 22, and the separator 23. The positive electrode 21 is covered with the positive electrode active material up to a portion of the positive electrode end 41, and the negative electrode 21 is covered with the negative electrode active material up to a portion of the negative electrode end 42.

Figure 3:
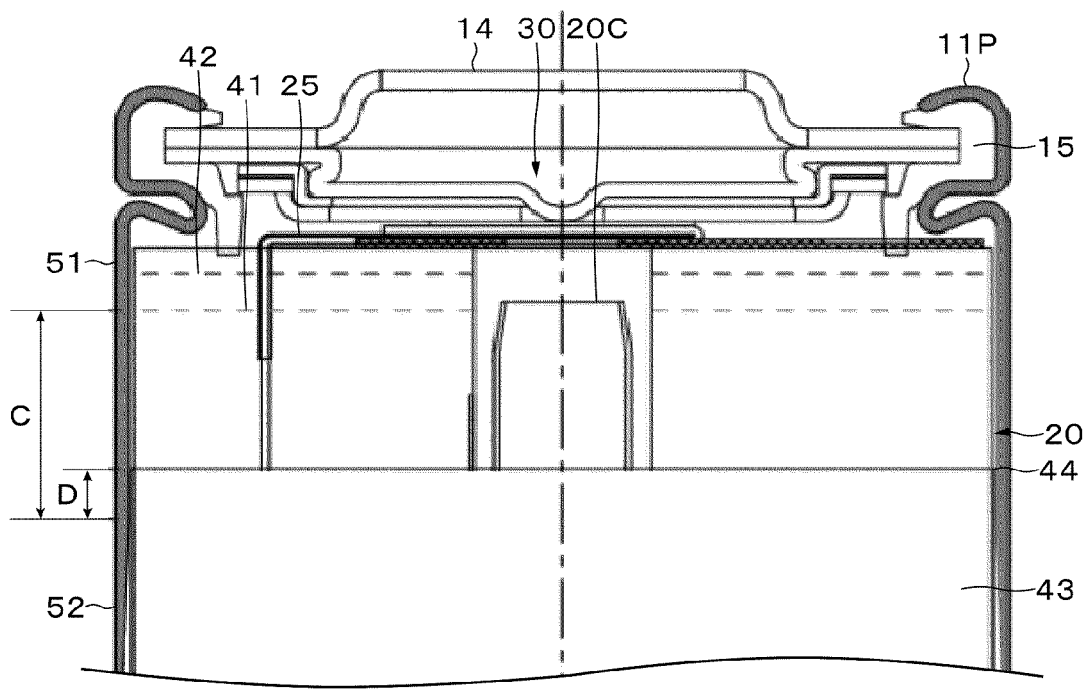
FIG. 3 is a diagram of describing Example 2.
Figure 4:
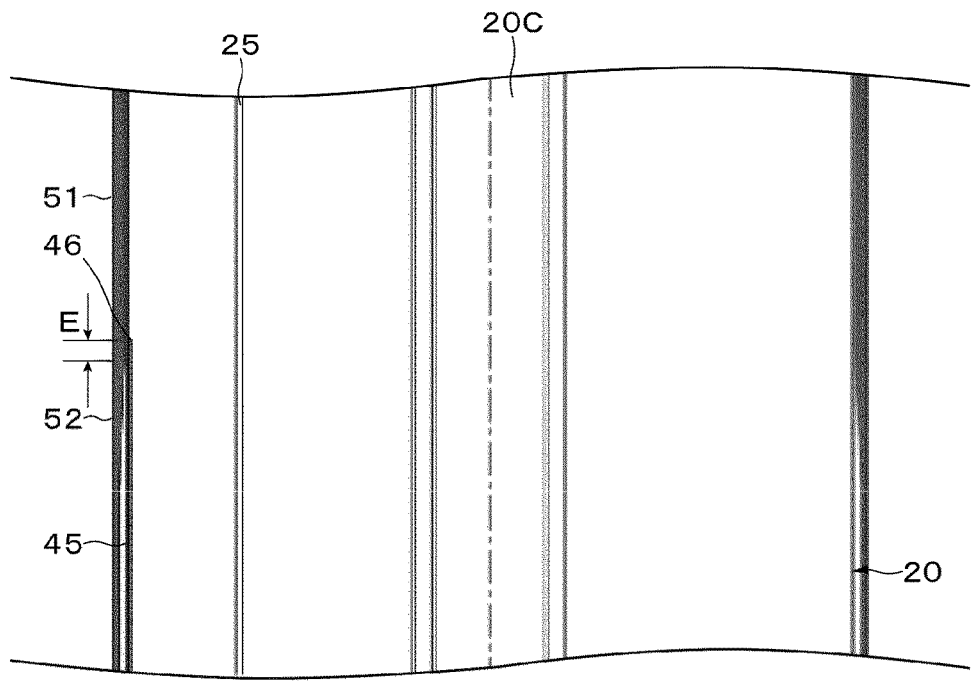
FIG. 4 is a diagram of describing Example 3.
Figure 5:
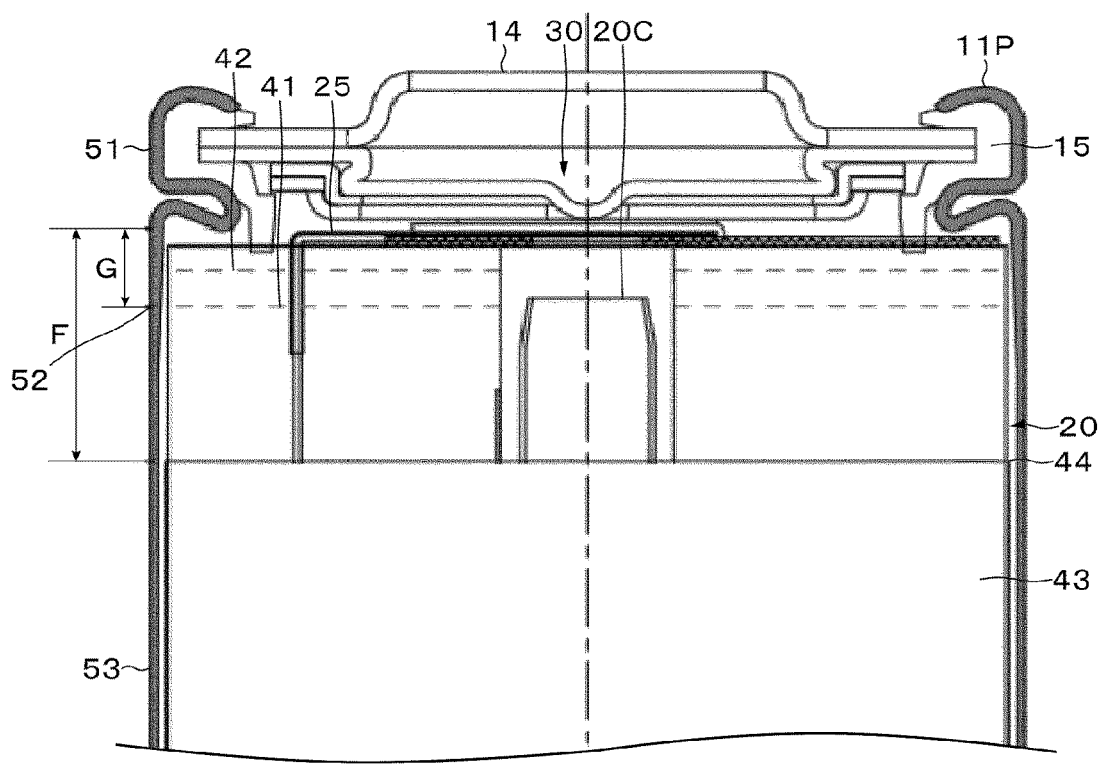
FIG. 5 is a diagram of describing Comparative Example 1.

FIGS. 2, 3, and 5 are sectional views for describing Example 1, Example 2, and Comparative Example 1, respectively, and are enlarged views of an upper portion of FIG. 1. In FIG. 2, FIG. 3, and FIG. 5, the fixing tape 43 on the outermost peripheral surface of the electrode wound body 20 is superimposed on the electrode wound body 20 for convenience of description. FIG. 4 is a sectional view for describing Example 3, and is an enlarged view of the central portion of FIG. 1. In FIGS. 2 to 5, the region of the battery can 11 and the region of the negative electrode outer tab 45 are indicated by gray.

Example 1

As shown in FIG. 2, the thick portion 51 was configured to extend from the bent portion 11P to a position of a length A (ranging from 0.5 mm to 0.9 mm) from the positive electrode end 41 toward the can bottom, and the thick portion 51 was disposed so as to overlap the positive electrode end 41. Note that the wording "overlap" means that a line virtually extended horizontally from the positive electrode end 41 in FIG. 2 intersects at least a part of the thick portion 51, and the wording "do not overlap" means that the line does not intersect that. The same applies to the wording "overlap" and the wording "do not overlap" in the following description of other configurations. The thickness varying portion 52 was disposed between a position of a length A (ranging from 0.5 mm to 0.9 mm) from the positive electrode end 41 toward the can bottom and a position of a length B (ranging from 2.4 mm to 2.8 mm) from the position of a length A toward the can bottom, such that the thick portion 51 was disposed so as not to overlap the fixing tape end 44. In the position apart from the positive electrode end 41 toward the can bottom by the distance of the sum of the length A and the length B or more, there were placed the thickness varying portion 52 and the thin portion 53, whereby the thick portion 51 was disposed so as not to overlap the negative electrode outer tab 45, and the thickness varying portion 52 or the thin portion 53 was disposed so as to overlap the negative electrode outer tab end 46.

Example 2

As shown in FIG. 3, the thick portion 51 was configured to extend from the bent portion 11P to a position of a length D (ranging from 0.8 mm to 1.2 mm) from the fixing tape end 44 toward the can bottom or to a position of a length C (ranging from 4.1 mm to 4.5 mm) from the positive electrode end 41 toward the can bottom, whereby the thick portion 51 was disposed so as to overlap the positive electrode end 41 and the fixing tape end 44. In the position apart from the fixing tape end 44 toward the can bottom by a length D (ranging from 0.8 mm to 1.2 mm) or more, there were disposed the thickness varying portion 52 and the thin portion 53, whereby the thick portion 51 was disposed so as not to overlap the negative electrode outer tab end 46, and the thickness varying portion 52 or the thin portion 53 was disposed so as to overlap the negative electrode outer tab end 46.

Example 3

As shown in FIG. 4, the thick portion 51 was configured to extend from the bent portion 11P to a position of a length E (ranging from 0.3 mm to 0.7 mm) from the negative electrode outer tab end 46 toward the can bottom, whereby the thick portion 51 was disposed so as to overlap the positive electrode end 41, the fixing tape end 44, and the negative electrode outer tab end 46.

Comparative Example 1

As shown in FIG. 5, the thick portion 51 was configured to extend from the bent portion 11P to a position of a length G (ranging from 1.4 mm to 1.8 mm) from the positive electrode end 41 toward the battery lid 14, or to a position of a length F (ranging from 4.7 mm to 5.1 mm) from the fixing tape end 44 toward the battery lid 14, whereby the thick portion 51 was disposed so as not to overlap the positive electrode end 41, the fixing tape end 44, and the negative electrode outer tab end 46, and the thickness varying portion 52 or the thin portion 53 was disposed so as to overlap the negative electrode outer tab end 46.

The samples from the above-described Examples and Comparative Example were subjected to a vibration test and an overcharge test, and evaluated. The vibration test is based on Standard UN 38.3. The sample was evaluated OK in a case where the value (average value) of the internal resistance after the vibration test increased by less than 10% before the vibration test, and the sample was evaluated NG in a case where the value increased by 10% or more before the vibration test. In the overcharge test, the battery was charged with a current of 1.0 ItA until overcharged by +0.5 V higher than 3.6 V as an upper limit voltage, then discharged with a current of 1.0 ItA, and when this process was defined as one cycle of charging and discharging, 20 cycles of charging and discharging were performed. Then, the battery subjected to 20 cycles was disassembled, and the positive electrode 21 or the negative electrode 22 was examined, the sample was evaluated OK in a case where no disconnected places was found by visual inspection in the positive electrode 21 or the negative electrode 22, and the sample was evaluated NG in a case where any disconnected place was found. Five samples were evaluated in each test. The results are shown in Table 1.

TABLE 1

| | Does thick portion overlap positive electrode end? | Does thick portion overlap fixing tape end? | Does thick portion overlap negative electrode outer tab end? | Vibration test | Overcharge test |
|---|---|---|---|---|---|
| Example 1 | Yes | No | No | OK | OK |
| Example 2 | Yes | Yes | No | OK | OK |
| Example 3 | Yes | Yes | Yes | OK | NG |
| Comparative Example 1 | No | No | No | NG | OK |

In Examples 1 to 3, the samples were evaluated OK in the vibration test, whereas in Comparative Example 1, the samples were evaluated NG in the vibration test. It is considered that in the batteries of Examples 1 to 3, the thick portion 51 overlapped the positive electrode end 41, whereby the electrode wound body 20 was pressed by the thick portion 51 and secured, so that if subjected to vibration, the electrode wound body 20 did not collide with the safety valve mechanism 30 and the like, thereby suppressing the increase in internal resistance. Therefore, it can be determined from Table 1 that battery 1 is a battery having a vibration resistance when the thick portion 51 is disposed so as to overlap at least the positive electrode end 41 in a sectional view. It can be determined that battery 1 is a battery having a vibration resistance when the thick portion 51 is furthermore disposed so as to overlap the fixing tape end 44 in a sectional view. It can be determined that the battery 1 is a battery having a vibration resistance when the thick portion 51 is furthermore disposed so as not to overlap the negative electrode outer tab end 46 in a sectional view.

In Example 1, Example 2, and Comparative Example 1, the samples were evaluated OK in the overcharge test, whereas in Example 3, the samples were evaluated NG in the overcharge test. It is considered that, in Example 3, the thick portion 51 overlapped the negative electrode outer tab end 46, whereby the negative electrode outer tab 45 compressed the electrode wound body 20 when the electrode wound body 20 expanded and contracted during charging and discharging, consequently the samples were evaluated NG. Therefore, it can be determined that, based on Examples 1 and 2 and Comparative Example 1, the battery 1 can withstand overcharge when the thin portion 53 or the thickness varying portion 52 is disposed so as to overlap the negative electrode outer tab end 46 in a sectional view.

While the present application has been described herein, the details of the present application are not limited thereto, and various modifications can be made.

For example, the present application can be applied to a battery other than a lithium ion battery or a battery having a shape other than a cylindrical shape. In an embodiment, battery 1 has a size of 18650 (diameter: 18 mm; height: 65 mm) but it may have a size of 21700 (diameter: 21 mm; height: 70 mm) or be in another sizes. The outer diameter of the electrode wound body 20, the thickness of the fixing tape 43, the thickness of the thick portion 51, and the thickness of the thin portion 53 may be in another sizes.

Figure 6:
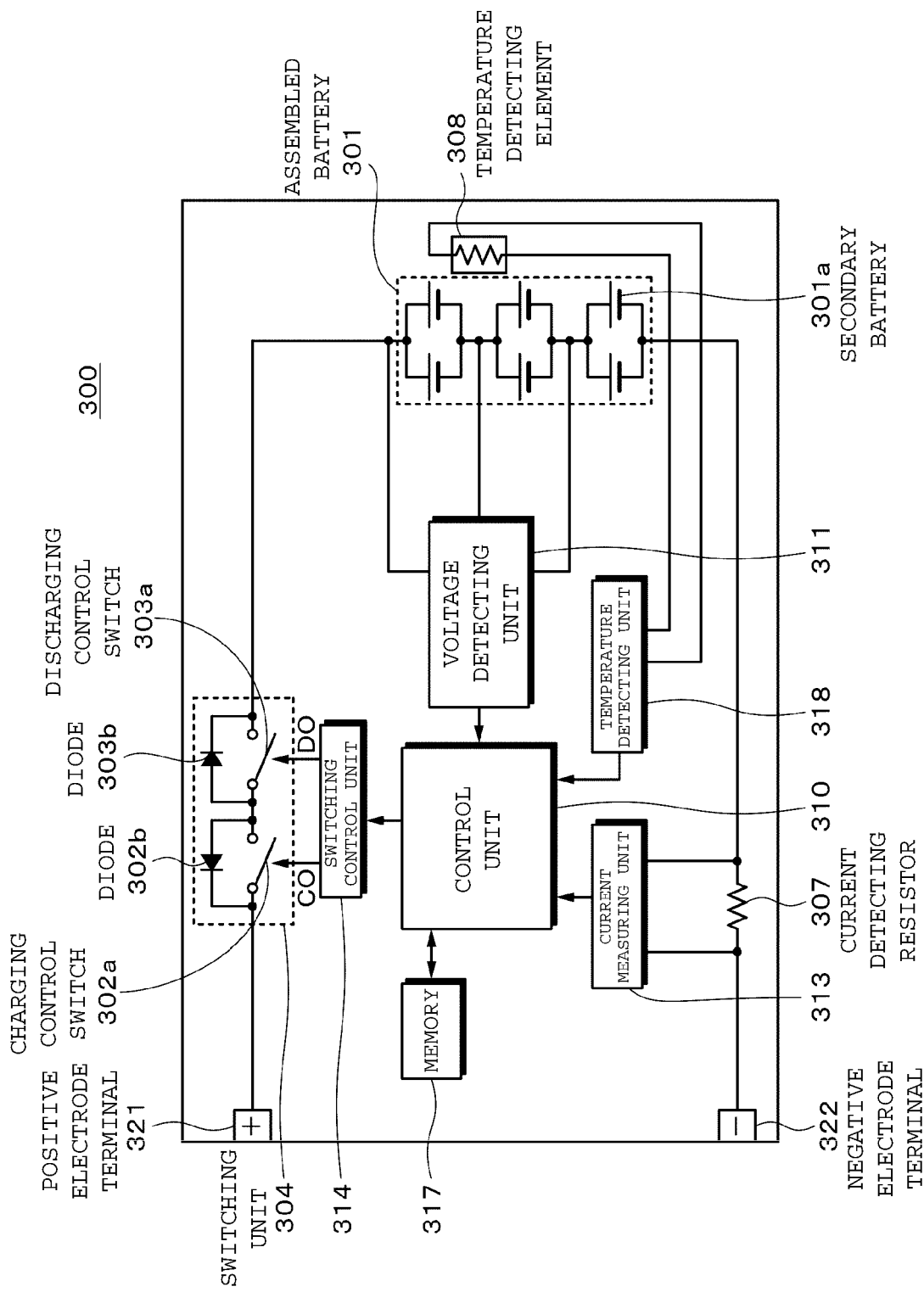
FIG. 6 is a connection diagram used for describing a battery pack as an application example of the present application.

FIG. 6 is a block diagram illustrating a circuit configuration example in a case where the battery 1 is applied to a battery pack 300 according to an embodiment. The battery pack 300 includes: an assembled battery 301; a switching unit 304 including a charging control switch 302*a* and a discharging control switch 303*a*; a current detecting resistor 307; a temperature detecting element 308; and a control unit 310. The control unit 310 can perform the control of each device, furthermore the control of charging and discharging at the time of abnormal heat generation, and the calculation and the correction of the remaining capacity of the battery pack 300. A positive electrode terminal 321 and a negative electrode terminal 322 of the battery pack 300 are connected to a charger or an electronic device, and through which the charging and discharging are performed.

The assembled battery 301 is formed by connecting a plurality of secondary batteries 301*a* in series and/or in parallel. FIG. 6 illustrates an example in the case of connecting six secondary batteries 301*a* in such a way that three of two batteries connected in parallel are connected in series (2P3S).

A temperature detecting unit 318, which is connected to the temperature detecting element 308 (e.g., a thermistor), measures the temperature of the assembled battery 301 or the battery pack 300, and provides the measured temperature to the control unit 310. A voltage detecting unit 311 measures the voltages of the assembled battery 301 and the secondary batteries 301*a* included in the assembled battery, converts the measured analogue voltage signal into a digital voltage signal, which is provided to the control unit 310. A current measuring unit 313 measures a current with the current detecting resistor 307 and provides the measured current to the control unit 310.

A switching control unit 314 controls the charging control switch 302*a* and the discharging control switch 303*a* of the switching unit 304 based on the voltage and the current input from the voltage detecting unit 311 and the current measuring unit 313. The switching control unit 314 sends a turn off control signal to the switching unit 304 when the secondary battery 301*a* has a voltage equal to or higher than an overcharge detection voltage (e.g., 4.20 V±0.05 V) or equal to or lower than an over-discharge detection voltage (2.4 V±0.1 V), thereby preventing overcharge or over-discharge.

After the charging control switch 302*a* or the discharging control switch 303*a* is turned off, charging or discharging can be performed only through a diode 302*b* or a diode 303*b*. For these charging/discharging switches, a semiconductor switch such as a MOSFET can be used. Note that in FIG. 6, the switching unit 304 is provided on the side of positive (+) terminal, but may be provided on the side of negative (−) terminal.

A memory 317 includes a RAM or a ROM, and stores and rewrites the battery characteristic values calculated by the control unit 310, a full charge capacity, the remaining capacity, and the like.

The battery 1 is mounted on a device such as an electronic device, an electric vehicle, or a power storage device, and can be used for supplying electric power according to an embodiment.

Examples of the electronic devices include notebook computers, smartphones, tablet terminals, PDAs (personal digital assistants), mobile phones, wearable terminals, digital still cameras, electronic books, music players, game machines, hearing aids, electric tools, televisions, lighting devices, toys, medical devices, and robots. Moreover, an electric vehicle, a power storage device, an electric tool, and an electric unmanned aerial vehicle to be described later can also be included in the electronic device in a broad sense.

Examples of the electric vehicle include an electric car (including hybrid car), an electric motorcycle, an electric assist bicycle, an electric bus, an electric cart, an automatic guided vehicle (AGV), and a railroad vehicle. In addition, an electric passenger aircraft and an electric unmanned aircraft for transportation are also included. The secondary battery is used not only as a propulsion power supply thereof but also as an auxiliary power supply, an energy regeneration power supply, and the like according to an embodiment.

Examples of the power storage device include a power storage module for commercial use or household use, and a power storage power source for construction such as a house, a building, or an office, or for a power generation facility.

Figure 7:
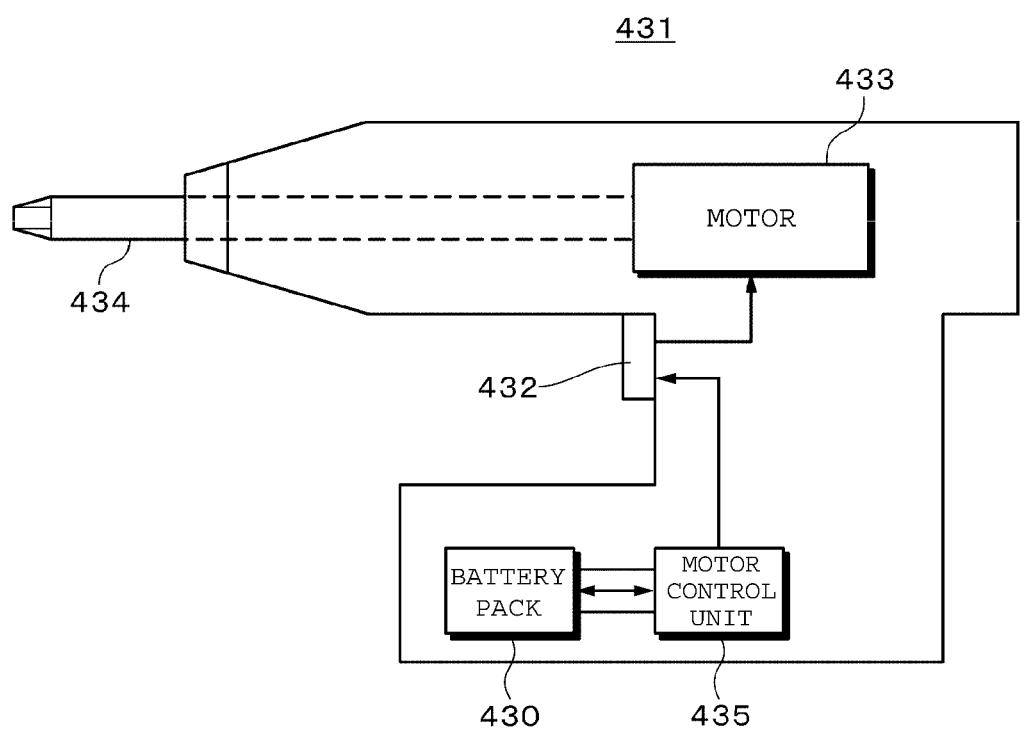
FIG. 7 is a connection diagram used for describing an electric tool as an application example of the present application.

An example of an electric driver as an electric tool to which the present application can be applied will be schematically described with reference to FIG. 7 according to an embodiment. An electric driver 431 is provided with a motor 433 that transmits rotational power to a shaft 434 and a trigger switch 432 operated by a user. A battery pack 430 and a motor control unit 435 are housed in a lower housing of a handle of the electric driver 431. The battery pack 430 is built in the electric driver 431 or is detachably coupled. The battery 1 can be used as a battery included in the battery pack 430 according to an embodiment.

Each of the battery pack 430 and the motor control unit 435 may be provided with a microcomputer (not illustrated) such that charge/discharge information of the battery pack 430 can be communicated with each other. The motor control unit 435 can control the operation of the motor 433 and cut off the power supply to the motor 433 at the time of abnormality such as over-discharge.

Figure 8:
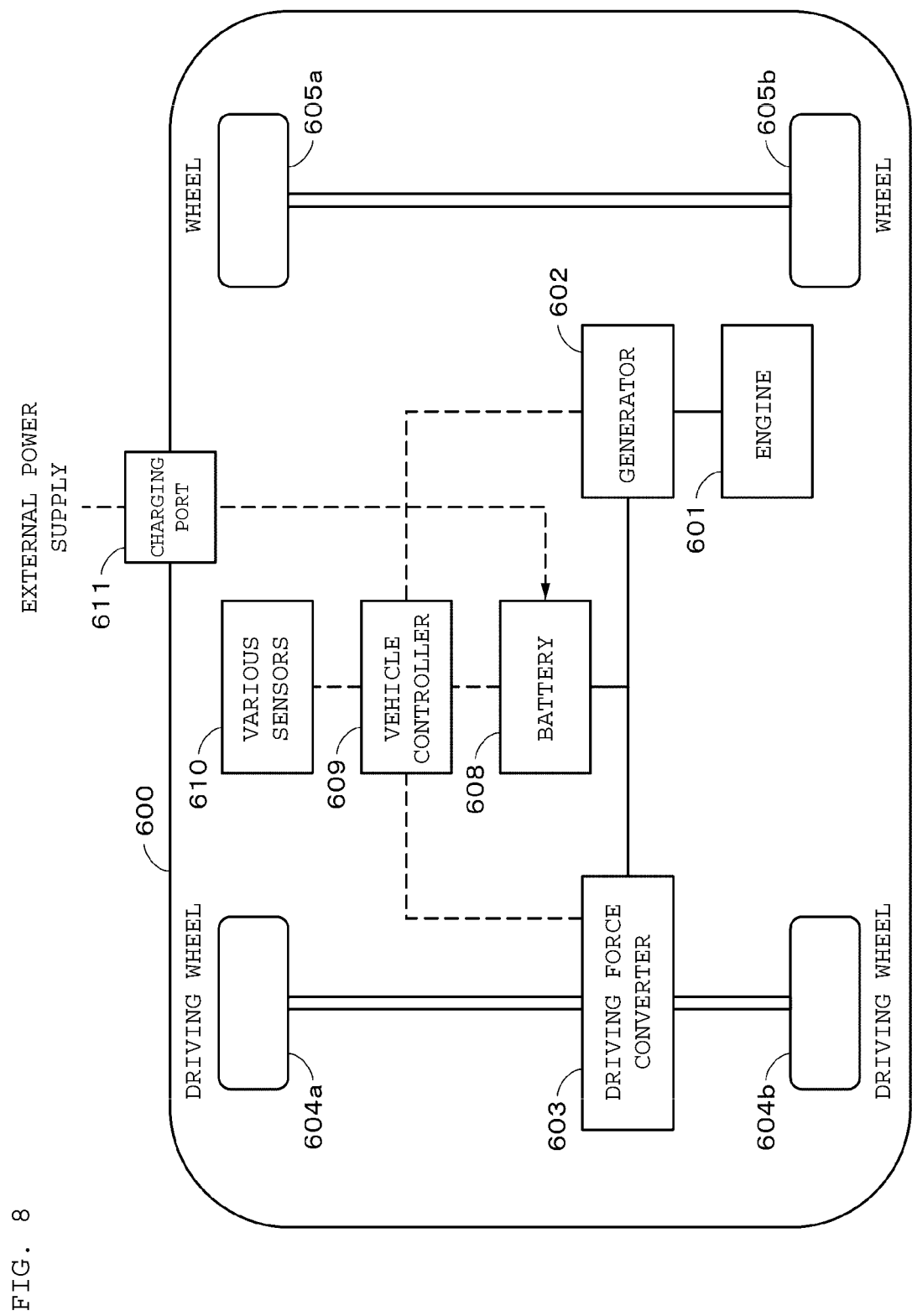
FIG. 8 is a connection diagram used for describing an electric vehicle as an application example of the present application.

As an example in which the present application is applied to a power storage system for an electric vehicle, FIG. 8 schematically illustrates a configuration example of a hybrid vehicle (HV) employing a series hybrid system. The series hybrid system is a vehicle that travels with a power driving force converter using electric power generated by a generator powered by an engine or electric power temporarily stored in a battery.

This hybrid vehicle 600 includes an engine 601, a generator 602, and a power driving force converter 603 (a DC motor or an AC motor, hereinafter, simply referred to as a "motor 603"), a driving wheel 604a, a driving wheel 604b, a wheel 605a, a wheel 605b, a battery 608, a vehicle controller 609, various sensors 610, and a charging port 611. As the battery 608, the battery pack 300 or a power storage module on which a plurality of the batteries 1 is mounted can be applied according to an embodiment.

The motor 603 is operated by the electric power of the battery 608, and the rotational force of the motor 603 is transmitted to the driving wheels 604a and 604b. The battery 608 can store the electric power generated at the generator 602 by the rotational force produced by the engine 601. The various sensors 610 control the engine speed, or control the position of a throttle valve (not illustrated) through the vehicle controller 609.

When the hybrid vehicle 600 is decelerated by a braking mechanism (not illustrated), a resistance force at the time of this deceleration is applied to the motor 603 as a rotational force, and this rotational force produces a regenerative power, which is accumulated in the battery 608. The battery 608 can be connected to an external power supply through the charging port 611 of the hybrid vehicle 600 so as to be charged. Such an HV vehicle is referred to as a plug-in hybrid vehicle (PHV or PHEV).

Note that the secondary battery according to the present application can also be applied to a downsized primary battery and used as a power source of a tire pressure monitoring system (TPMS) built in the wheels 604 and 605.

While the series hybrid vehicle has been described above as an example, the present application is also applicable to a parallel system combining an engine and a motor or a hybrid vehicle which uses a combination of a series system and a parallel system. Furthermore, the present application is also applicable to an electric car (EV or BEV) and a fuel cell vehicle (FCV) that travel only by a propulsion motor without using an engine.

DESCRIPTION OF REFERENCE SYMBOLS

1: Lithium ion battery
12, 13: Insulating plate
21: Positive electrode
22: Negative electrode
23: Separator
24: Center pin
25: Positive electrode leading-wire
26: Negative electrode leading-wire
41: Positive electrode end
44: Fixing tape end
45: Negative electrode outer tab
46: Negative electrode outer tab end
51: Thick portion
52: Thickness varying portion
53: Thin portion It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   an electrode wound body having a structure in which a strip-shaped negative electrode and a strip-shaped positive electrode opposing each other are laminated and wound with a separator interposed therebetween;
   a battery can accommodating the electrode wound body;
   a battery lid provided over a cavity of the battery can; and
   a negative electrode outer tab on an outermost periphery of the negative electrode,
   wherein the positive electrode has a positive electrode end that is located toward the battery lid,
   the battery can includes: a thick portion that is located toward the battery lid; a thin portion that is located toward a can bottom and has a thickness smaller than a thickness of the thick portion; and a thickness varying portion between the thick portion and the thin portion,
   in a sectional view, the thick portion is disposed so as to overlap the positive electrode end, and
   the thin portion or the thickness varying portion is disposed so as to overlap an end of the negative electrode outer tab that is located toward a battery lid in a sectional view.

2. The secondary battery according to claim 1, wherein an outermost peripheral surface of the electrode wound body is fixed with a fixing tape, and
   the thick portion is further disposed so as to overlap an end of the fixing tape that is located toward the battery lid in a sectional view.

3. The secondary battery according to claim 1, comprising a negative electrode outer tab on an outermost periphery of the negative electrode,
   wherein the thick portion is further disposed so as not to overlap an end of the negative electrode outer tab that is located toward the battery lid in a sectional view.

4. An electronic device comprising the secondary battery according to claim 1.

5. An electric tool comprising the secondary battery according to claim 1.

6. A secondary battery comprising:
   an electrode wound body having a structure in which a strip-shaped negative electrode and a strip-shaped positive electrode opposing each other are laminated and wound with a separator interposed therebetween;
   a battery can accommodating the electrode wound body;
   a battery lid provided over a cavity of the battery can; and
   a negative electrode outer tab on an outermost periphery of the negative electrode,
   wherein the positive electrode has a positive electrode end that is located toward the battery lid,
   the battery can includes: a thick portion that is located toward the battery lid; a thin portion that is located toward a can bottom and has a thickness smaller than a thickness of the thick portion; and a thickness varying portion between the thick portion and the thin portion, in a sectional view, the thick portion is disposed so as to overlap the positive electrode end, and the thick portion is further disposed so as not to overlap an end of the negative electrode outer tab that is located toward the battery lid in a sectional view.

7. The secondary battery according to claim 6, wherein an outermost peripheral surface of the electrode wound body is fixed with a fixing tape, and the thick portion is further disposed so as to overlap an end of the fixing tape that is located toward the battery lid in a sectional view.

8. The secondary battery according to claim 6, wherein the thin portion or the thickness varying portion is disposed so as to overlap an end of the negative electrode outer tab that is located toward a battery lid in a sectional view.

9. An electronic device comprising the secondary battery according to claim 6.

10. An electric tool comprising the secondary battery according to claim 6.

* * * * *